(12) United States Patent
Bernal et al.

(10) Patent No.: US 11,904,920 B2
(45) Date of Patent: Feb. 20, 2024

(54) LIFT CART WITH MECHANICALLY ACTUATED AUTOMATIC BRAKING DEVICE

(71) Applicant: Raytheon Company, Waltham, MA (US)

(72) Inventors: William Alexander Bernal, Huntsville, AL (US); Caleb Daniel Rideout, Tumacacori, AZ (US); Jacob L. Wymore, Arab, AL (US); Herald Harrington, Clarkdale, AZ (US); Kevin Brault, Chandler, AZ (US)

(73) Assignee: Raytheon Company, Waltham, MA (US)

( * ) Notice: Subject to any disclaimer, the term of this patent is extended or adjusted under 35 U.S.C. 154(b) by 137 days.

(21) Appl. No.: 17/531,422

(22) Filed: Nov. 19, 2021

(65) Prior Publication Data

US 2023/0159072 A1 May 25, 2023

(51) Int. Cl.
*B62B 3/02* (2006.01)
*B62B 5/04* (2006.01)

(52) U.S. Cl.
CPC ............... *B62B 3/02* (2013.01); *B62B 5/049* (2013.01); *B62B 2206/06* (2013.01)

(58) Field of Classification Search
CPC ........ B62B 3/02; B62B 5/049; B62B 2206/06
See application file for complete search history.

(56) References Cited

U.S. PATENT DOCUMENTS 3,811,535 A 5/1974 Preusser
3,987,871 A 10/1976 Nordskog
4,120,384 A 10/1978 Choy
4,199,042 A 4/1980 Kibler
4,302,025 A 11/1981 Waddell et al.
4,572,319 A 2/1986 Fontaine
4,629,036 A 12/1986 Choy
5,018,931 A 5/1991 Uttley
5,090,517 A 2/1992 Doughty
5,199,534 A 4/1993 Goff
5,323,879 A 6/1994 Poulin
5,325,938 A 7/1994 King
(Continued)

FOREIGN PATENT DOCUMENTS

AU 2018282330 B2 7/2019
AU 2018282332 B2 5/2022
(Continued)

OTHER PUBLICATIONS

International Search Report and Written Opinion for International Application No. PCT/US2022/043981, dated Jan. 19, 2023, 12 pages.

*Primary Examiner* — James A Shriver, II
*Assistant Examiner* — Nicholas R. Kandas
(74) *Attorney, Agent, or Firm* — Kinney & Lange, P.A.

(57) ABSTRACT

A lift cart includes a lift table that moves between a raised position and a lowest position and a braking device attached to the lift cart. A braking device includes an actuator, a linkage bar, and a first brake assembly. The linkage bar connects to the actuator. The linkage bar translates in a first direction upon activation of the actuator. The first brake assembly connects to the linkage bar. The first brake assembly moves from a deployed state to a retracted state as the linkage bar translates in the first direction.

19 Claims, 8 Drawing Sheets

(56) References Cited

U.S. PATENT DOCUMENTS

| | | | |
|---|---|---|---|
| 5,509,672 | A | 4/1996 | Offerson |
| 5,526,916 | A | 6/1996 | Amdahl et al. |
| 5,566,788 | A | 10/1996 | Smith et al. |
| 5,592,384 | A | 1/1997 | Wolf |
| 5,607,030 | A | 3/1997 | Swift et al. |
| 5,630,600 | A | 5/1997 | Pasillas |
| 5,649,718 | A | 7/1997 | Groglio |
| 5,722,515 | A | 3/1998 | Wyse |
| 5,735,367 | A | 4/1998 | Brubaker |
| 5,921,373 | A | 7/1999 | Amdahl et al. |
| 6,024,203 | A | 2/2000 | Amdahl et al. |
| 6,041,894 | A | 3/2000 | Otterson et al. |
| 6,123,343 | A | 9/2000 | Nolting et al. |
| 6,125,985 | A | 10/2000 | Amdahl et al. |
| 6,142,283 | A | 11/2000 | Amdahl et al. |
| 6,170,596 | B1 | 1/2001 | Triarsi et al. |
| 6,237,725 | B1 | 5/2001 | Otterson et al. |
| 6,244,366 | B1 | 6/2001 | Otterson et al. |
| 6,264,216 | B1 | 7/2001 | Wilson |
| 6,286,630 | B1 | 9/2001 | Obergfell |
| 6,397,961 | B1 | 6/2002 | Sutton |
| 6,419,053 | B1 | 7/2002 | Martin-Vegue et al. |
| 6,481,540 | B1 | 11/2002 | Nolting et al. |
| 6,827,364 | B1 | 12/2004 | Martin |
| 6,834,869 | B1 | 12/2004 | Adams |
| 6,905,089 | B1 | 6/2005 | Solis et al. |
| 7,172,207 | B2 | 2/2007 | Henry |
| 7,255,206 | B1 | 8/2007 | Hackbarth et al. |
| 7,396,026 | B1 | 7/2008 | Munson |
| 7,448,476 | B2 | 11/2008 | Otterson |
| 7,793,744 | B1 | 9/2010 | Hardie |
| 7,810,613 | B2 | 10/2010 | Lin |
| 8,406,993 | B2 | 3/2013 | Hannah et al. |
| 8,465,028 | B2 | 6/2013 | Wyse et al. |
| 8,571,778 | B2 | 10/2013 | Hannah et al. |
| 9,162,695 | B2 | 10/2015 | Tran |
| 9,290,196 | B1 | 3/2016 | Siegel |
| 10,281,450 | B2 | 5/2019 | Pileggi |
| 10,377,403 | B2 | 8/2019 | Lee et al. |
| 10,543,983 | B2 | 1/2020 | Otto et al. |
| 2002/0093163 | A1 | 7/2002 | Tai |
| 2002/0140189 | A1 | 10/2002 | McIntyre |
| 2003/0160499 | A1 | 8/2003 | Gonzalez |
| 2004/0124040 | A1 | 7/2004 | Crowley |
| 2004/0144601 | A1 | 7/2004 | Otterson |
| 2005/0194218 | A1 | 9/2005 | D'Arca |
| 2005/0205363 | A1 | 9/2005 | Peles |
| 2006/0273554 | A1 | 12/2006 | Henry |
| 2008/0319625 | A1 | 12/2008 | Hannah et al. |
| 2009/0127808 | A1 | 5/2009 | Otterson |
| 2009/0139804 | A1 | 6/2009 | Lin |
| 2013/0214502 | A1 | 8/2013 | Hannah et al. |
| 2015/0028568 | A1 | 1/2015 | Tran |
| 2017/0065355 | A1* | 3/2017 | Ross .................... A61B 50/13 |
| 2017/0081114 | A1 | 3/2017 | Mueller |
| 2017/0212025 | A1 | 7/2017 | Pileggi |
| 2017/0334644 | A1 | 11/2017 | Otto et al. |
| 2020/0070866 | A1 | 3/2020 | Rendall et al. |

FOREIGN PATENT DOCUMENTS

| | | |
|---|---|---|
| CA | 1070623 A | 1/1980 |
| CA | 2230695 C | 11/2004 |
| CA | 3077550 A1 | 11/2017 |
| CA | 3025297 C | 9/2019 |
| CA | 3041964 C | 10/2020 |
| CN | 1064446 A | 9/1992 |
| CN | 2177646 Y | 9/1994 |
| CN | 1215371 A | 4/1999 |
| CN | 1277638 A | 12/2000 |
| CN | 1295521 A | 5/2001 |
| CN | 2446003 Y | 9/2001 |
| CN | 2584447 Y | 11/2003 |
| CN | 2598821 Y | 1/2004 |
| CN | 2754968 Y | 2/2006 |
| CN | 2756523 Y | 2/2006 |
| CN | 2774884 Y | 4/2006 |
| CN | 201019953 Y | 2/2008 |
| CN | 201556874 U | 8/2010 |
| CN | 201817523 U | 5/2011 |
| CN | 202279632 U | 6/2012 |
| CN | 202896634 U | 4/2013 |
| CN | 102550307 B | 12/2013 |
| CN | 203447439 U | 2/2014 |
| CN | 103693125 A | 4/2014 |
| CN | 203528567 U | 4/2014 |
| CN | 203528568 U | 4/2014 |
| CN | 203528572 U | 4/2014 |
| CN | 203754347 U | 8/2014 |
| CN | 204210535 U | 3/2015 |
| CN | 204355122 U | 5/2015 |
| CN | 204659788 U | 9/2015 |
| CN | 204702146 U | 10/2015 |
| CN | 105146916 A | 12/2015 |
| CN | 104118802 B | 1/2016 |
| CN | 103538618 B | 4/2016 |
| CN | 205292908 U | 6/2016 |
| CN | 105775910 A | 7/2016 |
| CN | 105857370 A | 8/2016 |
| CN | 105899446 A | 8/2016 |
| CN | 205439818 U | 8/2016 |
| CN | 205819197 U | 12/2016 |
| CN | 2005772038 U | 12/2016 |
| CN | 206040484 U | 3/2017 |
| CN | 106672043 A | 5/2017 |
| CN | 106672848 A | 5/2017 |
| CN | 107106896 A | 8/2017 |
| CN | 206494681 U | 9/2017 |
| CN | 107498381 A | 12/2017 |
| CN | 105775734 B | 2/2018 |
| CN | 107676412 A | 2/2018 |
| CN | 107686052 A | 2/2018 |
| CN | 108025723 A | 5/2018 |
| CN | 108216328 A | 6/2018 |
| CN | 207449958 U | 6/2018 |
| CN | 106425680 B | 7/2018 |
| CN | 207777474 U | 8/2018 |
| CN | 106319595 B | 11/2018 |
| CN | 108791420 A | 11/2018 |
| CN | 208053393 U | 11/2018 |
| CN | 208165064 U | 11/2018 |
| CN | 208218236 U | 12/2018 |
| CN | 208278132 U | 12/2018 |
| CN | 109122475 A | 1/2019 |
| CN | 106428093 B | 2/2019 |
| CN | 109305342 A | 2/2019 |
| CN | 208469904 U | 2/2019 |
| CN | 109418208 A | 3/2019 |
| CN | 208559468 U | 3/2019 |
| CN | 208665151 U | 3/2019 |
| CN | 208699688 U | 4/2019 |
| CN | 208715238 U | 4/2019 |
| CN | 109809333 A | 5/2019 |
| CN | 208881842 U | 5/2019 |
| CN | 110040654 A | 7/2019 |
| CN | 110152259 A | 8/2019 |
| CN | 209553222 U | 10/2019 |
| CN | 110476858 A | 11/2019 |
| CN | 110481320 A | 11/2019 |
| CN | 209921366 U | 1/2020 |
| CN | 109415194 B | 4/2020 |
| CN | 111096275 A | 5/2020 |
| CN | 111194708 A | 5/2020 |
| CN | 111194709 A | 5/2020 |
| CN | 112320667 A | 2/2021 |
| DE | 3834523 C1 | 12/1989 |
| DE | 3834523 C1 * | 12/1989 |
| DE | 20308670 U1 | 12/2003 |
| DE | 202012002217 U1 | 4/2012 |
| DE | 102013008020 A1 | 11/2014 |
| EP | 0852043 A1 | 7/1998 |
| EP | 1062141 A1 | 12/2000 |
| EP | 1740445 A2 | 1/2007 |
| EP | 3163286 A2 | 5/2017 |

(56) References Cited

FOREIGN PATENT DOCUMENTS

| | | |
|---|---:|---|
| EP | 3452402 A2 | 3/2019 |
| EP | 3489190 A1 | 5/2019 |
| ES | 2342912 B1 | 6/2011 |
| FR | 3054539 A1 | 2/2018 |
| GB | 2277565 B | 10/1996 |
| IN | 2013MU01464 A | 5/2013 |
| JP | H0661649 U | 8/1994 |
| JP | 3269741 B2 | 4/2002 |
| JP | 3122892 U | 6/2006 |
| JP | 3888032 B2 | 2/2007 |
| JP | 4068741 B2 | 3/2008 |
| JP | 5595092 B2 | 9/2014 |
| JP | 2018514443 A | 6/2018 |
| JP | 6564880 B2 | 8/2019 |
| JP | 2019142716 A | 8/2019 |
| JP | 2019142722 A | 8/2019 |
| KR | 200421626 Y1 | 7/2006 |
| KR | 101323171 B1 | 10/2013 |
| KR | 20190004356 A | 1/2019 |
| KR | 102037057 B1 | 10/2019 |
| KR | 20190122270 A | 10/2019 |
| SU | 640779 A1 | 1/1979 |
| TR | 200002622 T2 | 11/2000 |
| WO | 9608796 A1 | 3/1996 |
| WO | 9711441 A1 | 3/1997 |
| WO | 9946157 A1 | 9/1999 |
| WO | 2004043764 A2 | 5/2004 |
| WO | 2005086589 A2 | 9/2005 |
| WO | 2017205390 A2 | 11/2017 |

\* cited by examiner

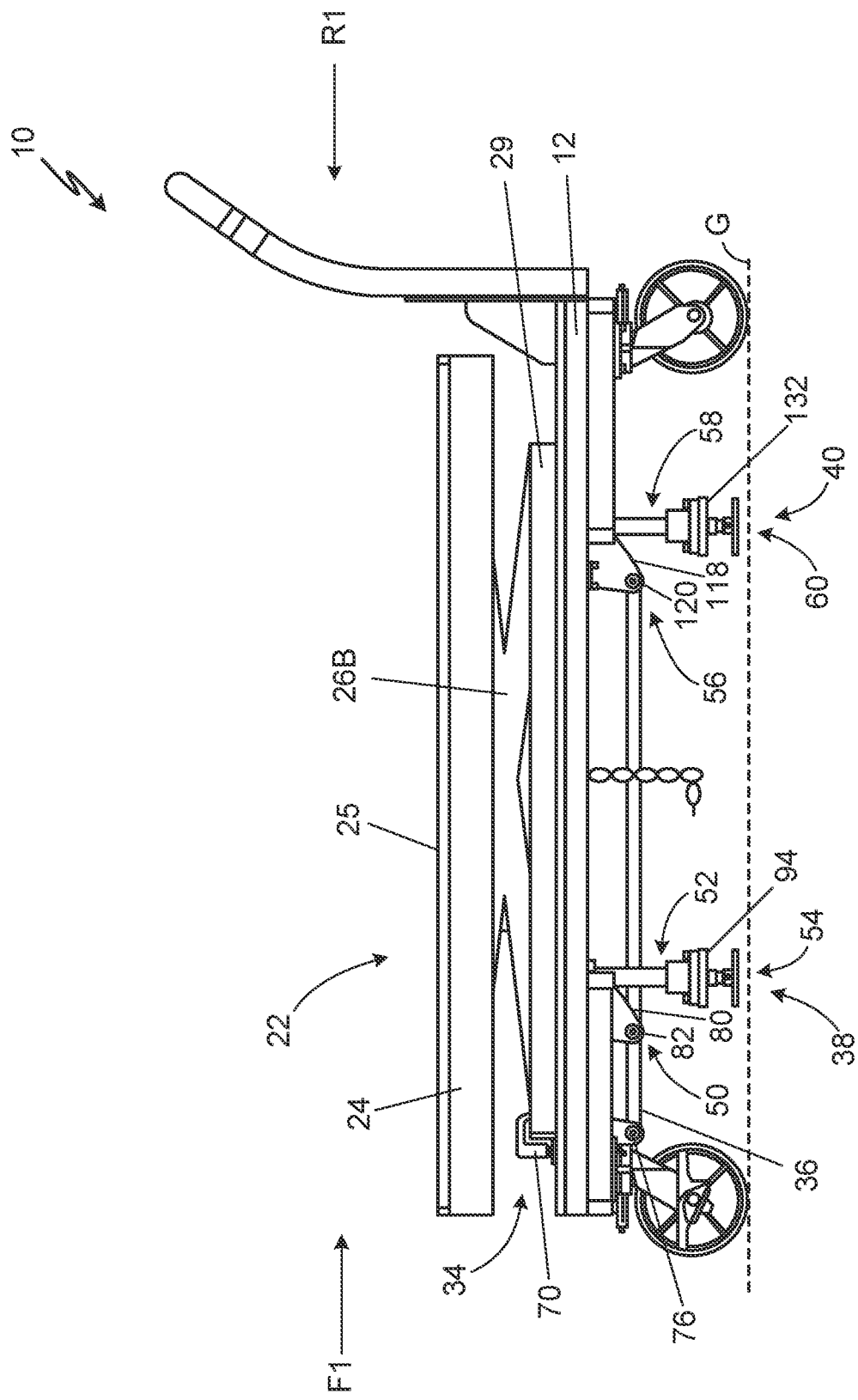

LIFT CART WITH MECHANICALLY ACTUATED AUTOMATIC BRAKING DEVICE

STATEMENT OF GOVERNMENT INTEREST

This invention was made with government support under HQ0276-15-C-0003 awarded by the Missile Defense Agency. The government has certain rights in the invention.

BACKGROUND

This application relates to braking devices and, more specifically, to braking devices for lift carts.

Scissor lift carts have tables that can be height-adjusted. When the table is in the lowest position, near the cart base, the center of gravity is low and the possibility of the cart tipping when moved is also low. However, when a cart is moved with the table in a higher position, the higher center of gravity increases possibility of the cart tipping. Typically, operating procedures require users to brake the cart before lifting the table and releasing the brakes after lowering the table. Reliance on human adherence to this braking procedure creates opportunities for user errors and cart tipping incidents.

SUMMARY

A lift cart includes a lift table that moves between a raised position and a lowest position and a braking device attached to the lift cart. A braking device includes an actuator, a linkage bar, and a first brake assembly. The linkage bar connects to the actuator. The linkage bar translates in a first direction upon activation of the actuator. The first brake assembly connects to the linkage bar. The first brake assembly moves from a deployed state to a retracted state as the linkage bar translates in the first direction.

A lift cart includes a cart platform, a lift table, and a braking device. The lift table is connected to a top side of the cart platform and moves between a raised position and a lowest position. The lift table includes a table platform, legs connected to and extending between a bottom side of the table platform and the top side of the cart platform, and a cross member connecting the legs and positioned adjacent to the top side of the cart platform. The braking device is connected to a bottom side of the cart platform. The braking device includes an actuator, a linkage bar connected to the actuator, and a first brake assembly connected to the linkage bar. The cross member of the lift table activates the actuator when the lift table is in the lowest position. The linkage bar translates in a first direction when the actuator is activated. The first brake assembly moves from a deployed state to a retracted state as the linkage bar translates in the first direction.

A lift cart includes a cart platform, a scissor lift table, and a braking device. The scissor lift table is connected to a top side of the cart platform and moves between a raised position and a lowest position. The scissor lift table includes a table platform, scissor legs connected to and extending between a bottom side of the table platform and the top side of the cart platform, and a cross member connecting the scissor legs and positioned adjacent to the top side of the cart platform. The braking device is connected to a bottom side of the cart platform. The braking device includes an actuator, a linkage bar connected to the actuator, and a first brake assembly connected to the linkage bar. The cross member of the scissor lift table activates the actuator when the scissor lift table is in the lowest position. The linkage bar translates in a first direction when the actuator is activated. The first brake assembly moves from a deployed state to a retracted state as the linkage bar translates in the first direction.

BRIEF DESCRIPTION OF THE DRAWINGS

FIG. 5A is a side view of the lift cart with the scissor lift table in a lowest position and the braking device retracted.

DETAILED DESCRIPTION

Figure 1A:
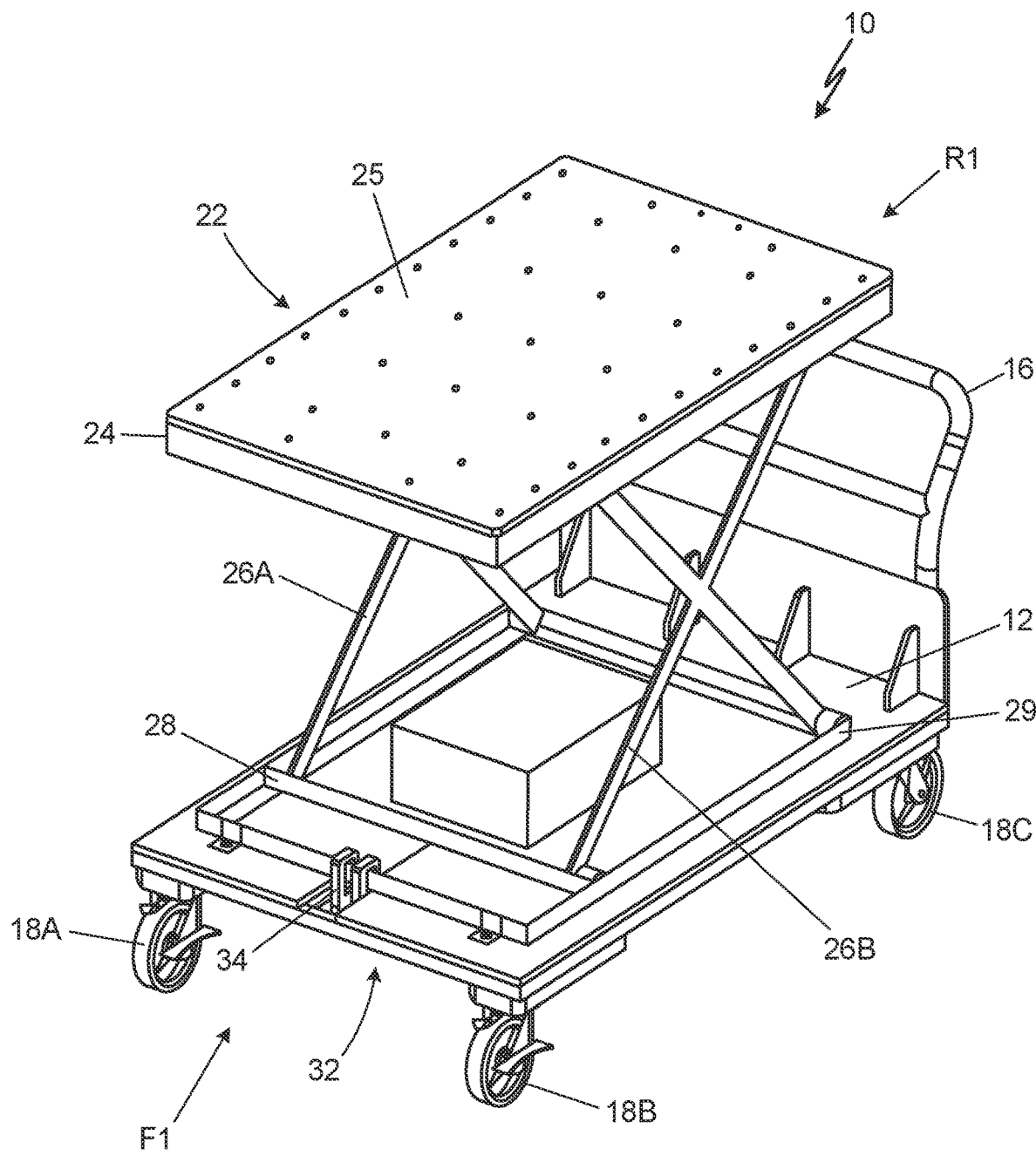
FIG. 1A is a top perspective view of a lift cart.
Figure 1B:
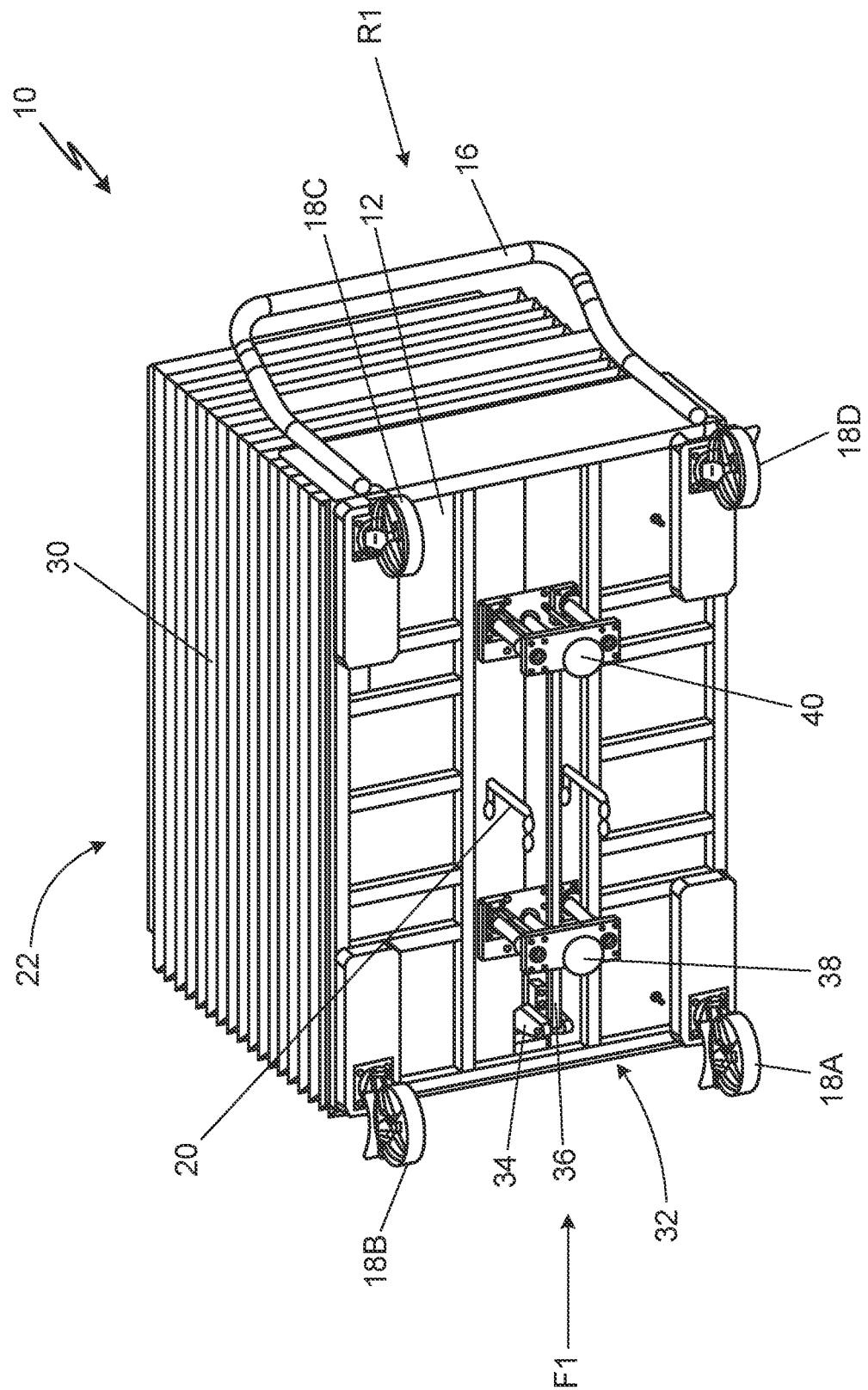
FIG. 1B is a bottom perspective view of the lift cart.

FIG. 1A is a top perspective view of lift cart 10. FIG. 1B is a bottom perspective view of lift cart 10. 1A-1B will be discussed together. Lift cart 10 includes cart platform 12, handle 16, wheel 18A, wheel 18B, wheel 18C, wheel 18D (shown in FIG. 1B), drag chain 20 (shown in FIG. 1B), and scissor lift table 22. Scissor lift table 22 includes table platform 24 (shown in FIG. 1A), adapter plate 25 (shown in FIG. 1A), scissor legs 26A (shown in FIG. 1A), scissor legs 26B (shown in FIG. 1A), cross member 28 (shown in FIG. 1A), guide frame 29 (shown in FIG. 1A), and cover 30 (shown in FIG. 1B). Lift cart 10 also includes braking device 32, which includes actuator 34, linkage bar 36 (shown in FIG. 1B), first brake assembly 38 (shown in FIG. 1B), and second brake assembly 40 (shown in FIG. 1B). FIGS. 1A-1B further show front F1 and rear R1.

Lift cart 10 is positioned in FIGS. 1A-1B so that front F1 of lift cart 10 is toward the left of the figures and rear R1 of lift cart 10 is toward the right of the figures. Lift cart 10 has platform 12 that forms a base of lift cart 10. Handle 16 is connected to cart platform 12 at rear R1 of lift cart 10. Wheels 18A, 18B, 18C, and 18D are connected to a bottom side of cart platform 12. Drag chain 20 also connects to the bottom side of cart platform 12.

Scissor lift table 22 is connected to a top side of cart platform 12. Table platform 24 is a top of scissor lift table 22. Table platform 24 is a flat surface. Adapter plate 25 is bolted to a top of table platform 24. Adapter plate 25 is shown in FIGS. 1A-1B as being a flat plate, but can have any suitable design in alternate embodiments. Further, scissor lift table 22 may not include adapter plate 25 in some embodiments. As shown in FIG. 1A, scissor legs 26A and scissor legs 26B are connected to and extend between a bottom side of table platform 24 and the top side of cart platform 12. Scissor legs 26A and scissor legs 26B are positioned within guide frame 29. Guide frame 29 is bolted to the top side of cart platform 12 and connects scissor lift table 22 to cart platform 12. Guide frame 29 is bolted to the top side of cart platform 12 and connects scissor lift table 22 to cart platform 12. Guide frame 29 limits sideways and rearward movement of scissor legs 26A and 26B. Guide frame 29 also creates a front stop for scissor legs 26A and 26B. Cross member 28 connects scissor legs 26A to scissor legs 26B and is adjacent to the top side of cart platform 12. Cross member 28 is configured to slide along rollers positioned between cross member 28 and guide frame 29 as scissor lift table 22 is raised and lowered. As shown in FIG. 1B, scissor lift table 22 can include cover 30 extending from table platform 24 to the top side of cart platform 12 enclosing scissor legs 26A, scissor legs 26B, guide frame 29, and portions of braking device 32 that are above the top surface of cart platform 12.

Scissor lift table 22 is configured to move between a lowest position and a raised position. The lowest position is a position where table platform 24 is fully lowered as far as it can be and is as close to the upper surface of cart platform 12 as scissor legs 26A and scissor legs 26B allow. Further, in the lowest position, cross member 28 is positioned as far forward in guide frame 29 as possible. A raised position is any position other than the lowest position. The raised position is a position in which table platform 24 has been raised from the lowest position and cross member 28 has been moved away from the forward point in guide frame 29.

Braking device 32 is connected to the bottom side of cart platform 12. Actuator 34 is near front F1 of lift cart 10. An upper portion of actuator 34 hooks around a front side of guide frame 29. Actuator 34 extends through cart platform 12 from the top side to the bottom side. Actuator 34 is pivotally mounted to the bottom side of cart platform 12. A front of linkage bar 36 connects to actuator 34. As shown in FIG. 1B, linkage bar 36 also connects to first brake assembly 38 and second brake assembly 40. Second brake assembly 40 connects to a rear of linkage bar 36. First brake assembly 38 connects to linkage bar 36 between actuator 34 and second brake assembly 40. In alternate embodiments, lift cart 10 can include a single brake assembly or three or more brake assemblies. First brake assembly 38 and second brake assembly 40 are spring-loaded. A top of first brake assembly 38 and a top of second brake assembly 40 are fixedly mounted to the bottom side of cart platform 12.

Braking device 32 is only in a retracted state when scissor lift table 22 is in the lowest position. Braking device 32 is in a deployed state when scissor lift table 22 is raised from the lowest position into the raised position. When braking device 32 is in the deployed state, first brake assembly 38 and second brake assembly 40 are in a deployed state and rest on a floor. When braking device 32 is in the retracted state, first brake assembly 38 and second brake assembly 40 are in a retracted state and are raised off the floor.

Braking device 32 moves from the deployed state to the retracted state when scissor lift table 22 moves from the raised position to the lowest position. When braking device 32 is in the deployed state, first brake assembly 38 and second brake assembly 40 are resting on the floor. Scissor legs 26A and scissor legs 26B support and move table platform 24 vertically from the raised position to the lowest position. When scissor lift table 22 is in the raised position, cross member 28 is not in contact with the upper portion of actuator 34 that is hooked around guide frame 29. As scissor lift table 22 moves to the lowest position, cross member 28 moves forward towards front F1 of lift cart 10 and contacts actuator 34. Forward motion of cross member 28 provides the necessary force to activate actuator 34 when scissor lift table 22 is in the lowest position.

When actuator 34 is activated, linkage bar 36 translates toward the rear of lift cart 10. First brake assembly 38 moves from the deployed state to the retracted state as linkage bar 36 translates rearward. Similarly, second brake assembly 40 moves from the deployed state to the retracted state as linkage bar 36 translates rearward. When linkage bar 36 translates rearward, first brake assembly 38 and second brake assembly 40 are moved to the retracted state, which compresses gas springs of first bake assembly 38 and second brake assembly 40. When first brake assembly 38 and second brake assembly 40 are in the retracted state, braking device 32 is in the retracted state and lift cart 10 can move. Forward pressure from cross member 28 on actuator 34 provides the necessary force to activate actuator 34 and translate linkage bar 36 rearward to move first brake assembly 38 and second brake assembly 40 from the deployed state to the retracted state. Braking device 32 is only in the retracted state when scissor lift table 22 is in the lowest position.

Braking device 32 moves from the retracted state to the deployed state when scissor lift table 22 moves from the lowest position to the raised position. Braking device 32 is in the retracted state when scissor lift table 22 is in the lowest position. Scissor legs 26A and scissor legs 26B support and move table platform 24 vertically from the lowest position to the raised position. When scissor lift table 22 is in the raised position, cross member 28 no longer presses actuator 34 forward, and thus, no longer activates actuator 34. When actuator 34 is released, the gas springs in first brake assembly 38 and second brake assembly 40 release stored compressive force. As the gas springs release the stored compressive force, first brake assembly 38 and second brake assembly 40 move into the deployed state. When first brake assembly 38 and second brake assembly 40 move into the deployed state, linkage bar 36 translates toward the front of lift cart 10. Forward translation of linkage bar 36 restores actuator 34 to the non-activated position. Braking device 32 is in the deployed state when scissor lift table 22 is in the raised position and lift cart 10 cannot move.

Lift cart 10 is safer than comparable lift carts because braking device 32 reduces the likelihood of lift cart 10 tipping. Lift cart 10 has a higher center of gravity while scissor lift table 22 is in the raised position and the lowest center of gravity while scissor lift table 22 is in the lowest position. Moving lift cart 10 with scissor lift table 22 in the raised position increases the likelihood of a tip-over accident. Braking device 32 automatically deploys without other user intervention when scissor lift table 22 is in the raised position. Therefore, scissor lift table 22 must be in the lowest position, and have the lowest center of gravity, to move. Further, the lowest position is so low that scissor lift table 22 must be in the raised position for table platform 24 to be at a comfortable height for an adult to work on table platform 24. When the user puts scissor lift table 22 in the raised position to comfortably work, braking device 32 will automatically deploy without other user intervention. Braking device 32 decreases reliance on user compliance to braking protocol. Lift cart 10 also includes several other features to increase safety. Cover 30 surrounds scissor legs 26A and scissor legs 26B to increase the safety of using scissor lift table 22 by reducing operators' access to pinch points within scissor lift table 22. Drag chain 20 reduces static electricity buildup on lift cart 10 to protect projects vulnerable to static electric discharge.

Figure 2:
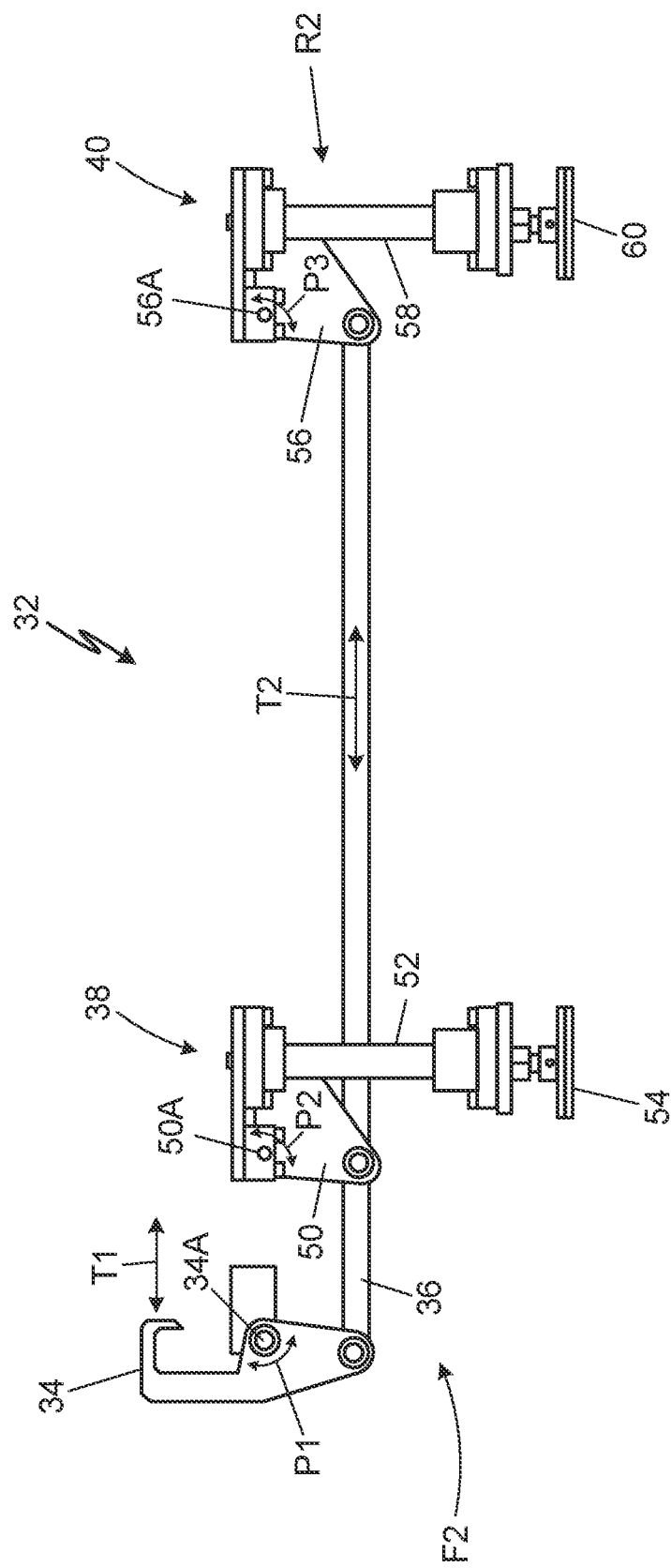
FIG. 2 is a side view of a braking device.

FIG. 2 is a side view of braking device 32. Braking device 32 includes actuator 34 with pivot point 34A, linkage bar 36, first brake assembly 38, and second brake assembly 40. First brake assembly 38 includes first linkage assembly 50 with pivot point 50A, first brake extension assembly 52, and first brake post assembly 54. Second brake assembly 40 includes second linkage assembly 56 with pivot point 56A, second brake extension assembly 58, and second brake post assembly 60. FIG. 2 also includes front F2, rear R2, arrow T1, arrow T2, arrow P1, arrow P2, and arrow P3.

Braking device 32 is oriented in FIG. 2 so that front F2 of braking device 32 is on the left of the figure and rear R2 of braking device 32 is on the right of the figure. Actuator 34 is in the front of braking device 32. Actuator 34 is connected to the front of linkage bar 36. Pivot point 34A is within actuator 34 and above linkage bar 36. Linkage bar 36 also connects to first brake assembly 38 and second brake assembly 40. Second brake assembly 40 connects to the rear of linkage bar 36. First brake assembly 38 connects to linkage bar 36 between actuator 34 and second brake assembly 40. First brake assembly 38 and second brake assembly 40 are spring-loaded. First linkage assembly 50 links first brake assembly 38 to linkage bar 36. First linkage assembly 50 includes pivot point 50A located above linkage bar 36. First linkage assembly 50 also connects to a top of first brake extension assembly 52. First brake post assembly 54 connects to a bottom of first brake extension assembly 52. Second linkage assembly 56 links second brake assembly 40 to linkage bar 36. Second linkage assembly 56 includes pivot point 56A located above linkage bar 36. Second linkage assembly 56 also connects to a top of second brake assembly 40. Second brake post assembly 60 connects to a bottom of second brake extension assembly 58.

Braking device 32 moves from the deployed state to the retracted state when actuator 34 is activated by a lift table, such as scissor lift table 22 shown in FIGS. 1A-1B, moving to the lowest position. Actuator 34 is released when the lift table is in the raised position. Braking device 32 is in the deployed state when actuator 34 is released, shown in FIG. 2. When braking device 32 is in the deployed state, first brake assembly 38 is in the deployed state and first brake post assembly 54 is in a deployed state resting on the floor. First brake post assembly 54 is in a retracted state when first brake post assembly 54 is raised off the floor. When braking device 32 is in the deployed state, second brake assembly 40 is in the deployed state and second brake post assembly 60 is in a deployed state resting on the floor. Second brake post assembly 60 is in a retracted state when second brake post assembly 60 is raised off the floor.

When the lift table is in the lowest position, the lift table activates actuator 34 and provides the necessary force to move braking device 32 into the retracted state. Actuator 34 translates toward front F2 of braking device 32 when actuator 34 is activated, as shown by arrow T1. Actuator 34 pivots counterclockwise around pivot point 34A, as shown by arrow P1. Counterclockwise pivoting around pivot point 34A causes linkage bar 36 to translate toward the rear of braking device 32. Arrow T2 shows the translation of linkage bar 36.

First brake assembly 38 moves from the deployed state to the retracted state as linkage bar 36 translates rearward. Rearward translation of linkage bar 36 causes counterclockwise pivoting in first linkage assembly 50 around pivot point 50A, as shown by arrow P2. Counterclockwise pivoting of first linkage assembly 50 pulls first brake extension assembly 52 upwards and raises first brake post assembly 54 from the deployed state to the retracted state. Similarly, second brake assembly 40 moves from the deployed state to the retracted state as linkage bar 36 translates rearward. Rearward translation of linkage bar 36 causes counterclockwise pivoting in second linkage assembly 56 around pivot point 56A, as shown by arrow P3. Counterclockwise pivoting of second linkage assembly 56 pulls second brake extension assembly 58 upwards and raises second brake post assembly 60 from the deployed state to the retracted state. As first brake assembly 38 and second brake assembly 40 move into the retracted state, gas springs within first brake assembly 38 and second brake assembly 40 are compressed. When first brake post assembly 54 and second brake post assembly 60 are in the retracted state, braking mechanism 32 is in the retracted state. Continued force against actuator 34 from the lift table being in the lowest position maintains the compression of the gas springs within first brake assembly 38 and second brake assembly 40 and holds braking device 32 in the retracted state.

Braking device 32 returns to the deployed state when the lift table is in the raised position. Compressive force is removed from actuator 34 and actuator 34 is released when the lift table is in the raised position. The gas springs in first brake assembly 38 and second brake assembly 40 are released when actuator 34 is released. The released gas springs force first brake extension assembly 52 and second brake extension assembly 58 downward. First brake post assembly 54 and second brake post assembly 60 are forced into the deployed state as first brake extension assembly 52 and second brake extension assembly 58, respectively, are forced downward. First linkage assembly 50 pivots clockwise around pivot point 50A by downward motion of first brake extension assembly 52. Second linkage assembly 56 pivots clockwise around pivot point 56A by downward motion of second brake extension assembly 58. Clockwise pivoting of first linkage assembly 50 and second linkage assembly 56 translates linkage bar 36 towards the front of braking device 32. Linkage bar 36 is free to move towards the front of braking device 32 when actuator 34 is not activated. Forward motion of linkage bar 36 pivots actuator 34 clockwise. Braking device 32 is in the deployed state.

Braking device 32 moves from the deployed state into the retracted state automatically by activation of actuator 34. Braking device 32 also moves from the retracted state back to the deployed state by the release of actuator 34. When actuator 34 is activated, indicating that a lift cart with braking device 32 attached is safe to move, automatic retraction of braking device 32 allows for less user error in following otherwise necessary braking protocols. Braking device 32 is completely mechanical. No electronics or batteries are necessary to move braking device 32 between the deployed state and the retracted state, which reduces the cost to build and operate braking device 32. Using first brake post assembly 54 and second brake post assembly 60 as brakes allows for braking device 32 to be retrofitted to many kinds of carts and devices because any wheels on those devices would not be disturbed.

Figure 3A:
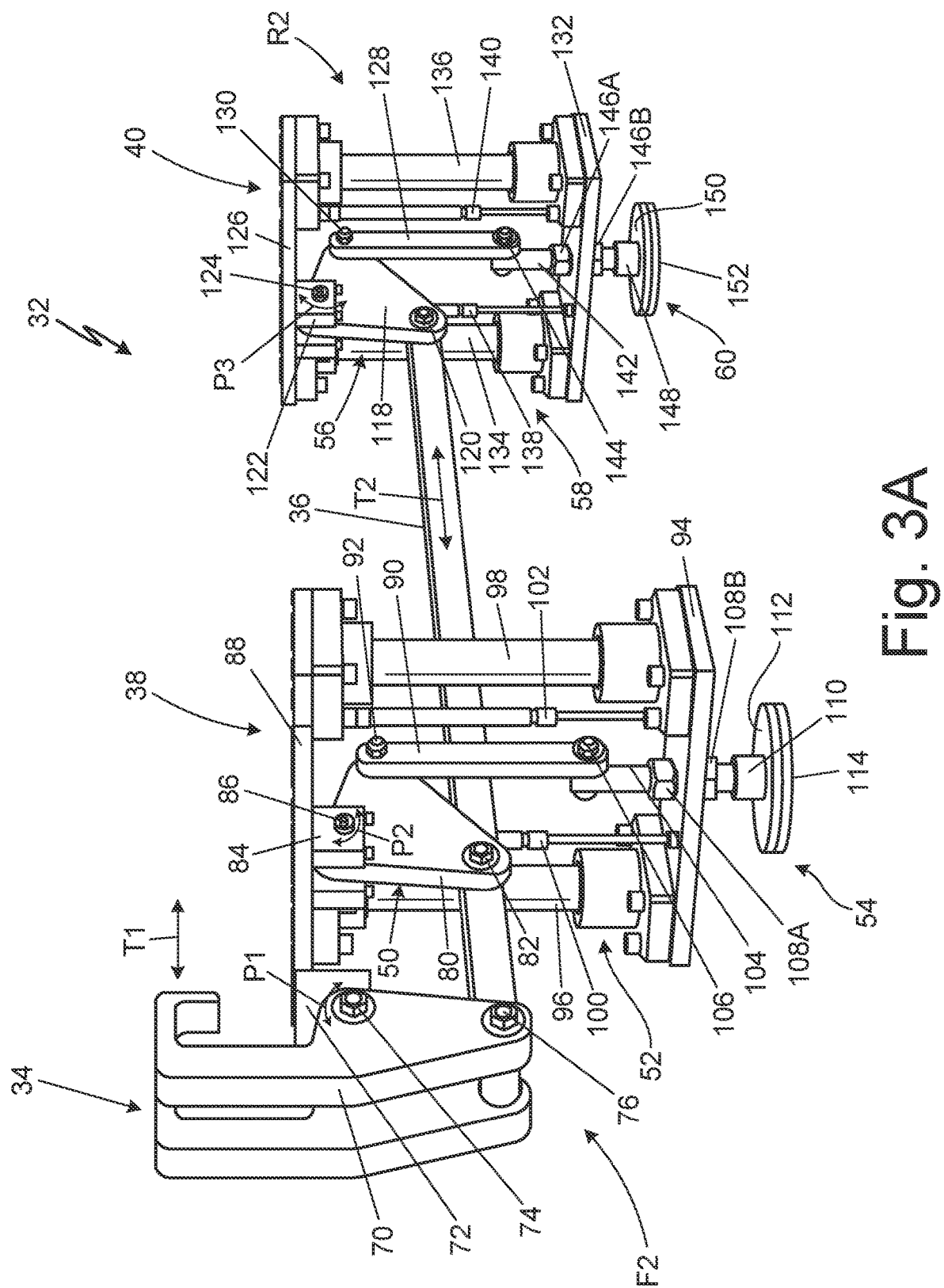
FIG. 3A is a front perspective view of the braking device.
Figure 3B:
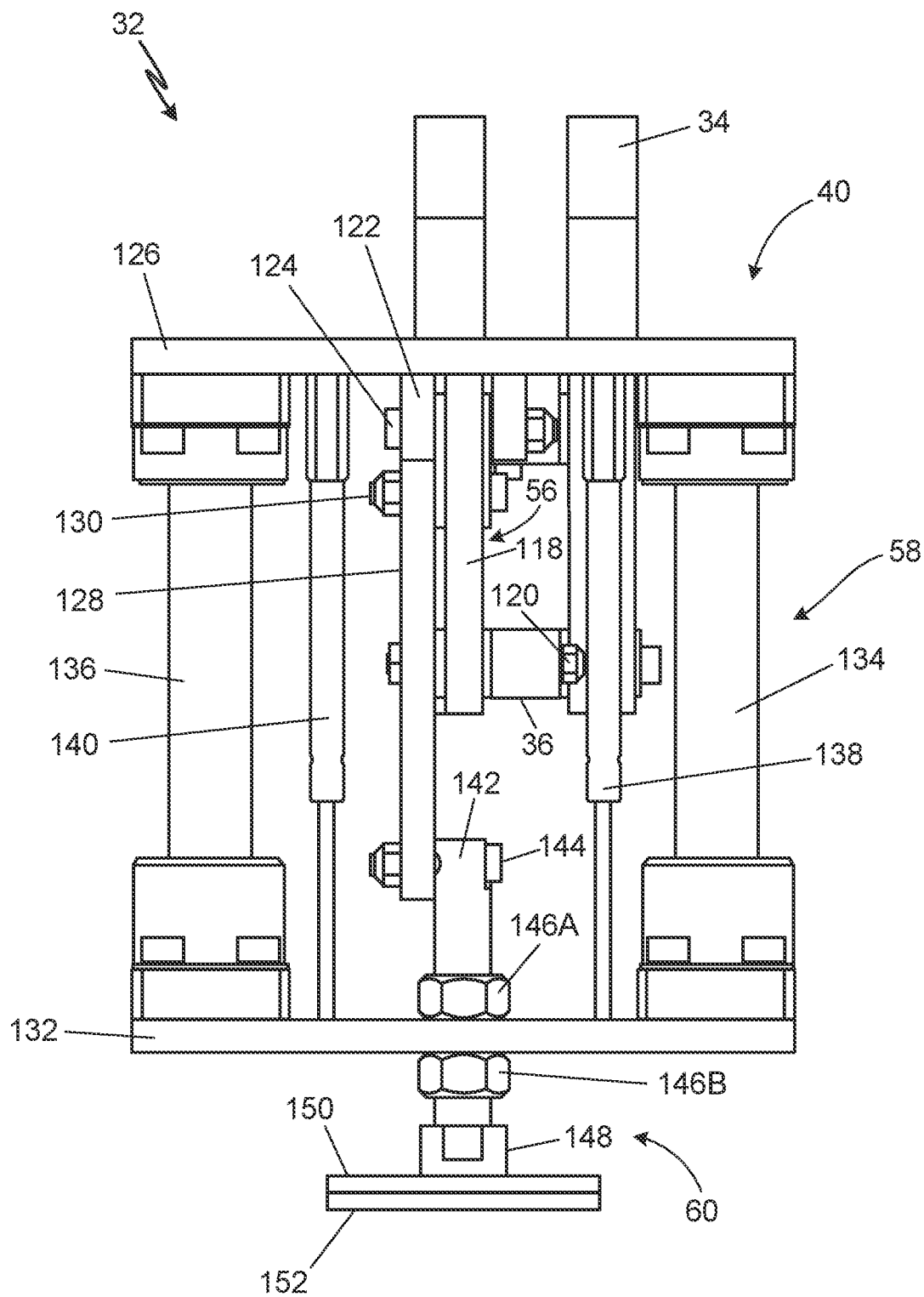
FIG. 3B is a rear view of the braking device.

FIG. 3A is a front perspective view of braking device 32. FIG. 3B is a rear view of braking device 32. Braking device 32 includes actuator 34, linkage bar 36, first brake assembly 38 (including first linkage assembly 50, first brake extension assembly 52, and first brake post assembly 54), and second brake assembly 40 (including second linkage assembly 56, second brake extension assembly 58, and second brake post assembly 60). Actuator 34 includes actuator claw 70, actuator mounting block 72, pivot mount 74, and attachment point 76. First linkage assembly 50 includes rocker arm 80 and attachment point 82. First brake extension assembly 52 includes rocker arm mounting block 84, pivot mount 86, top mounting plate 88, drop linkage 90, attachment point 92, compression plate 94, first guidepost 96, second guidepost 98, first gas spring 100, and second gas spring 102. First brake post assembly 54 includes shaft 104, attachment point 106, hex nut 108A, hex nut 108B, mounting collar 110, brake pad backing plate 112, and brake pad 114. Second linkage assembly 56 includes rocker arm 118 and attachment point 120. Second brake extension assembly 58 includes rocker arm mounting block 122, pivot mount 124, top mounting plate 126, drop linkage 128, attachment point 130, compression plate 132, third guidepost 134, fourth guidepost 136, third gas spring 138, and fourth gas spring 140. Second brake post assembly 60 includes shaft 142, attachment point 144, hex nut 146A, hex nut 146B, mounting collar 148, brake pad backing plate 150, and brake pad 152. FIG. 3A also includes front F2, rear R2, arrow T1, arrow T2, arrow P1, arrow P2, and arrow P3

Braking device 32 is oriented in FIG. 3A so that front F2 is toward the left of the figure and rear R2 is toward the right of the figure. Actuator 34 is toward the front of braking device 32. Linkage bar 36 connects actuator 34, first brake assembly 38, and second brake assembly 40. First brake assembly 38 is located on linkage bar 36 between actuator 34 and second brake assembly 40.

Actuator 34 includes actuator claw 70, actuator mounting block 72, pivot mount 74, and attachment point 76. Actuator claw 70 pivotally connects to actuator mounting block 72 by pivot mount 74. Actuator claw 70 connects to linkage bar 36 by attachment point 76. Actuator 34 mounts to a cart so that actuator claw 70 extends through a cart platform from a top side of the cart platform to a bottom side. Actuator mounting block 72 affixes to the bottom side of the cart platform. Actuator claw 70 pivotally connects to the bottom side of the cart platform by pivot mount 74 through actuator mounting block 72.

First brake assembly 38 includes first linkage assembly 50, first brake extension assembly 52, and first brake post assembly 54. First brake assembly 38 connects to linkage bar 36 by first linkage assembly 50. First linkage assembly 50 includes rocker arm 80 and attachment point 82. Rocker arm 80 is a triangular linkage member. A first vertex of rocker arm 80 connects to linkage bar 36 by attachment point 82. A second vertex and a third vertex of rocker arm 80 each connect to first brake extension assembly 52. First linkage assembly 50 links first brake extension assembly 52 to linkage bar 36.

First brake extension assembly 52 connects first linkage assembly 50 to first brake post assembly 54. First brake extension assembly 52 includes rocker arm mounting block 84, pivot mount 86, top mounting plate 88, drop linkage 90, attachment point 92, compression plate 94, first guidepost 96, second guidepost 98, first gas spring 100, and second gas spring 102. Rocker arm mounting block 84 connects to the second vertex of rocker arm 80 with pivot mount 86. Rocker arm mounting block 84 is fixed to top mounting plate 88. The third vertex of rocker arm 80 connects to drop linkage 90 by attachment point 92. Drop linkage 90 is located within first brake extension assembly 52 between top mounting plate 88 and compression plate 94. Top mounting plate 88 is a top of first brake assembly 38. Compression plate 94 is a bottom of first brake extension assembly 52. Compression plate 94 connects to top mounting plate 88 by first guidepost 96 and second guidepost 98. First guidepost 96 is on a first side of drop linkage 90. Second guidepost 98 is on a second side of drop linkage 90. First gas spring 100 and second gas spring 102 are between top mounting plate 88 and compression plate 94. First gas spring 100 is between first guidepost 96 and the first side of drop linkage 90. Second gas spring 102 is between second guidepost 98 and the second side of drop linkage 90.

First brake extension assembly 52 connects to first brake post assembly 54 by drop linkage 90. First brake post assembly 54 includes shaft 104, attachment point 106, hex nut 108A, hex nut 108B, mounting collar 110, brake pad backing plate 112, and brake pad 114. Drop linkage 90 connects to shaft 104 by attachment point 106. Shaft 104 extends through compression plate 94. Shaft 104 is a threaded shaft. Hex nut 108A and hex nut 108B are threaded onto shaft 104. Hex nut 108A is on a top of compression plate 94 and hex nut 108B is on a bottom of compression plate 94. Mounting collar 110 is on shaft 104 underneath hex nut 108B. Brake pad backing plate 112 connects to mounting collar 110. Brake pad 114 connects to brake pad backing plate 112.

Second brake assembly 40 has a similar configuration to first brake assembly 38. Second brake assembly 40 connects to linkage bar 36 by second linkage assembly 56. Second linkage assembly 56 includes rocker arm 118 and attachment point 120. Rocker arm 118 is a triangular linkage member. A first vertex of rocker arm 118 connects to linkage bar 36 by attachment point 120. A second vertex and a third vertex of rocker arm 118 each connect to second brake extension assembly 58. Second linkage assembly 56 links second brake extension assembly 58 to linkage bar 36.

Second brake extension assembly 58 connects second linkage assembly 56 to second brake post assembly 60. Second brake extension assembly 58 includes rocker arm mounting block 122, pivot mount 124, top mounting plate 126, drop linkage 128, attachment point 130, compression plate 132, third guidepost 134, fourth guidepost 136, third gas spring 138, and fourth gas spring 140. Rocker arm mounting block 122 connects to the second vertex of rocker arm 118 with pivot mount 124. Rocker arm mounting block 122 is fixed to top mounting plate 126. The third vertex of rocker arm 118 connects to drop linkage 128 by attachment point 130. Drop linkage 128 is located within second brake extension assembly 58 between top mounting plate 126 and compression plate 132. Top mounting plate 126 is a top of second brake assembly 40. Compression plate 132 is a bottom of second brake extension assembly 58. Compression plate 132 connects to top mounting plate 126 by third guidepost 134 and fourth guidepost 136. Third guidepost 134 is on a first side of drop linkage 128. Fourth guidepost 136 is on a second side of drop linkage 128. Third gas spring 138 and fourth gas spring 140 are between top mounting plate 126 and compression plate 132. Third gas spring 138 is between third guidepost 134 and the first side of drop linkage 128. Fourth gas spring 140 is between fourth guidepost 136 and the second side of drop linkage 128.

Second brake extension assembly 58 connects to second brake post assembly 60 by drop linkage 128. Second brake post assembly 60 includes shaft 142, attachment point 144, hex nut 146A, hex nut 146B, mounting collar 148, brake pad backing plate 150, and brake pad 152. Drop linkage 128 connects to shaft 142 by attachment point 144. Shaft 142 extends through compression plate 132. Shaft 142 is a threaded shaft. Hex nut 146A and hex nut 146B are threaded onto shaft 142. Hex nut 146A is above compression plate 132 and hex nut 146B is below compression plate 132. Mounting collar 148 is on shaft 142 underneath hex nut 146B. Brake pad backing plate 150 connects to mounting collar 148. Brake pad 152 connects to brake pad backing plate 150.

Braking device 32 is in the deployed state when actuator 34 is released, as shown in FIGS. 3A-3B. Actuator 34 is released when a lift table, such as scissor lift table 22, is in the raised position. When braking device 32 is in the deployed state, first brake assembly 38 and second brake assembly 40 are in the deployed state. When first brake assembly 38 is in the deployed state, first brake post assembly 54 is in the deployed state with brake pad 114 resting on the floor. When second brake assembly 40 is in the deployed state, second brake post assembly 60 is in the deployed state with brake pad 152 resting on the floor. First brake post assembly 54 and second brake post assembly 60 are in the retracted state when brake pad 114 and brake pad 152 are raised off the floor.

When the lift table moves into the lowest position, braking device 32 moves into the retracted state. The lift table activates actuator 34 with forward pressure at an upper portion of actuator claw 70, as shown by arrow T1. Forward pressure from the lift able on the upper portion of actuator claw 70 provides the necessary force to move braking device 32 into the retracted state. Actuator claw 70 pivots counterclockwise about pivot mount 74, as shown by arrow P1, when the lift table forces the upper portion of actuator claw 70 to translate forward. Counterclockwise pivoting of actuator claw 70 translates linkage bar 36 toward the rear of braking device 32, as shown by arrow T2.

First brake assembly 38 moves from the deployed state to the retracted state as linkage bar 36 translates rearward. Rearward translation of linkage bar 36 causes the first vertex of rocker arm 80 to translate rearward. The second vertex of rocker arm 80 pivots counterclockwise around pivot point 86, as shown by arrow P2. The movements of the first vertex and the second vertex cause the third vertex of rocker arm 80 to translate vertically upwards. Counterclockwise pivoting in rocker arm 80 pulls drop linkage 90 upwards with the third vertex. Drop linkage 90 in turn raises shaft 104 and retracts first brake post assembly 54 from the deployed state to the retracted state. As shaft 104 moves upward, hex nut 108A and hex nut 108B lift compression plate 94. Lifting compression plate 94 as first brake post assembly 54 is raised from the deployed state to the retracted state compresses first gas spring 100 and second gas spring 102. First gas spring 100 and second gas spring 102 are compressed when first brake assembly 38 is in the retracted state. First guidepost 96 and second guidepost 98 keep first brake extension assembly 52 and first brake post assembly 54 straight as first brake assembly 38 moves to the retracted state. While the lift table is in the lowest position, pressure is continuously exerted on the upper portion of actuator claw 70 and first gas spring 100 and second gas spring 102 are continuously compressed.

Second brake assembly 40 moves from the deployed state to the retracted state as linkage bar 36 translates rearward. Rearward translation of linkage bar 36 causes the first vertex of rocker arm 118 to translate rearward. The second vertex of rocker arm 118 pivots counterclockwise around pivot point 124, as shown by arrow P3. The movements of the first vertex and the second vertex cause the third vertex of rocker arm 118 to translate vertically upwards. Counterclockwise pivoting in rocker arm 118 pulls drop linkage 130 upwards with the third vertex. Drop linkage 130 in turn raises shaft 142 and retracts second brake post assembly 60 from the deployed state to the retracted state. As shaft 142 moves upward, hex nut 146A and hex nut 146B lift compression plate 132. Lifting compression plate 132 as second brake post assembly 60 is raised from the deployed state to the retracted state compresses third gas spring 138 and fourth gas spring 140. Third gas spring 138 and fourth gas spring 140 are compressed when second brake assembly 40 is in the retracted state. Third guidepost 134 and fourth guidepost 136 keep second brake extension assembly 58 and second brake post assembly 60 straight as second brake assembly 40 moves to the retracted state. While the lift table is in the lowest position, pressure is continuously exerted on the upper portion of actuator claw 70 and third gas spring 138 and fourth gas spring 140 are continuously compressed.

Braking device 32 returns to the deployed state when the lift table is raised into the raised position because actuator 34 is released. When the lift table is in the raised position, there is no forward pressure on the upper portion of actuator claw 70. Without pressure on actuator claw 70 from the lift table, compressive force on first gas spring 100, second gas spring 102, third gas spring 138, and fourth gas spring 140 is released. When first gas spring 100 and second gas spring 102 are released, stored compressive force pushes compression plate 94 down. Compression plate 94 is tied to shaft 104 by hex nut 108A and hex nut 108B. As compression plate 94 is forced down by first gas spring 100 and second gas spring 102, shaft 104 is forced down and first brake post assembly 54 moves into the deployed state. With first brake post assembly 54 in the deployed state, brake pad 114 rests on the floor. When shaft 104 moves down because of first gas spring 100 and second gas spring 102 pressing on compression plate 94, shaft 104 pulls drop linkage 90 down through attachment point 92. Drop linkage 90 in turn pulls the third vertex of rocker arm 80 down and pivots rocker arm 80 clockwise around pivot point 86, as shown by arrow P2.

Third gas spring 138 and fourth gas spring 140 are also released when the lift table moves to the raised position and pressure on actuator claw 70 is released. Stored compressive force in third gas spring 138 and fourth gas spring 140 pushes compression plate 132 down. Compression plate 132 is tied to shaft 142 by hex nut 146A and hex nut 146B. As compression plate 132 is forced down by third gas spring 138 and fourth gas spring 140, shaft 142 is forced down and second brake post assembly 60 moves into the deployed state. With second brake post assembly 60 in the deployed state, brake pad 152 rests on the floor. When shaft 142 moves down because of third gas spring 138 and fourth gas spring 140 pressing on compression plate 132, shaft 142 pulls drop linkage down through attachment point 130. Drop linkage 128 pulls the third vertex of rocker arm 118 down and pivots rocker arm 118 clockwise around pivot point 124, as shown by arrow P3.

Clockwise pivoting of rocker arm 80 and rocker arm 118 translates linkage bar 36 towards the front of braking device 32. Forward motion of linkage bar 36 pivots actuator claw 70 clockwise around pivot point 74. Braking device 32 is in the deployed state when the lift table is in the raised position because first gas spring 100, second gas spring 102, third gas spring 138, and fourth gas spring 140 force compression plate 94 and compression plate 132 down.

Braking device 32 moves from the deployed state into the retracted state automatically by activation of actuator 34. Braking device 32 also moves from the retracted state back to the deployed state by the release of actuator 34. Braking device 32 is completely mechanical. No electronics or batteries are necessary to move braking device 32 between the deployed state and the retracted state, which reduces the cost to build and operate braking device 32. Using first brake post assembly 54 and second brake post assembly 60 as brakes allows for braking device 32 to be retrofitted to many kinds of carts and devices because any wheels on those devices would not be disturbed. Actuator mounting block 72, top mounting plate 88, and top mounting plate 126 allow for easy mounting on bottoms of carts.

Figure 4:
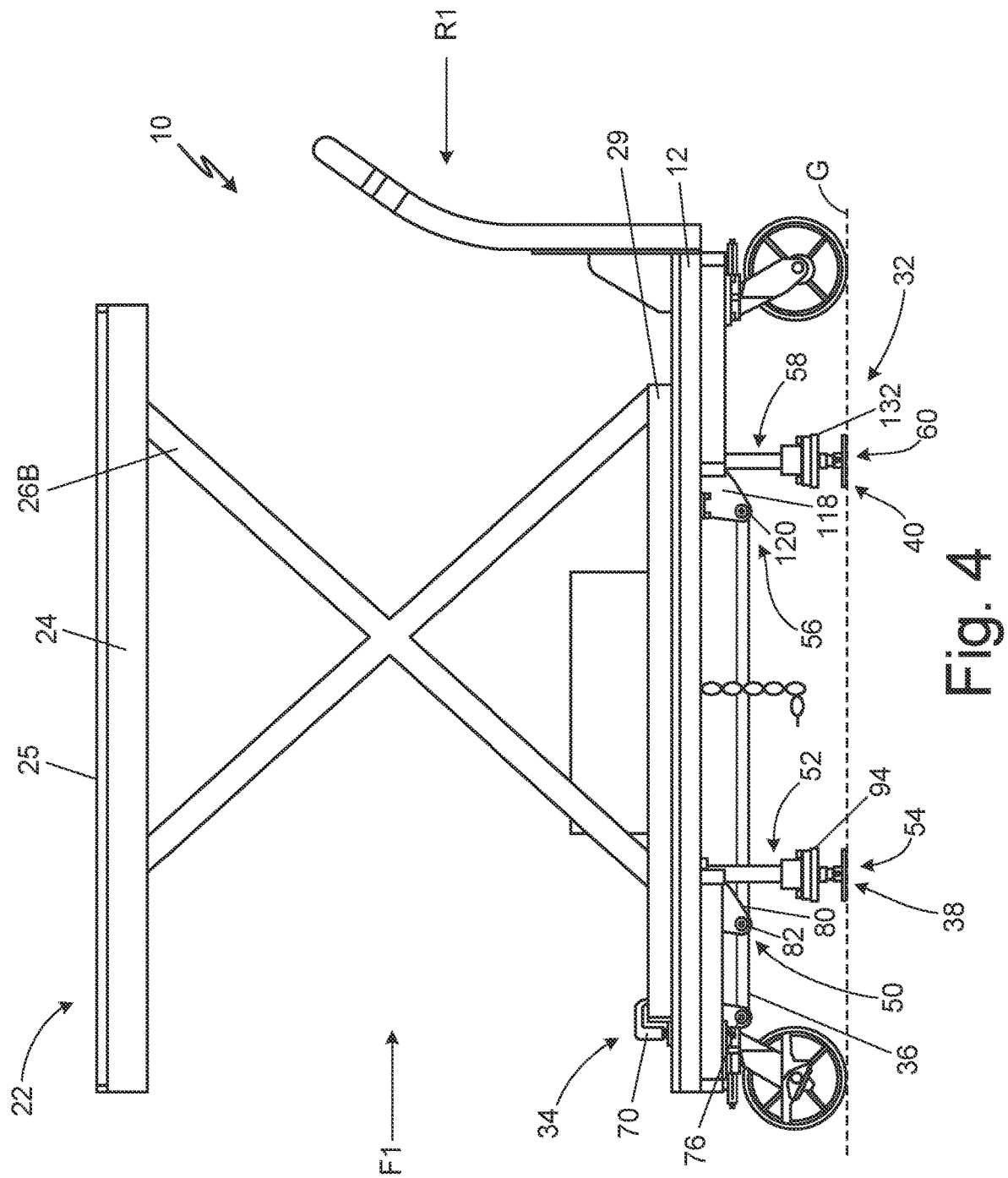
FIG. 4 is a side view of the lift cart with a scissor lift table in the raised position and the braking device deployed.
Figure 5B:
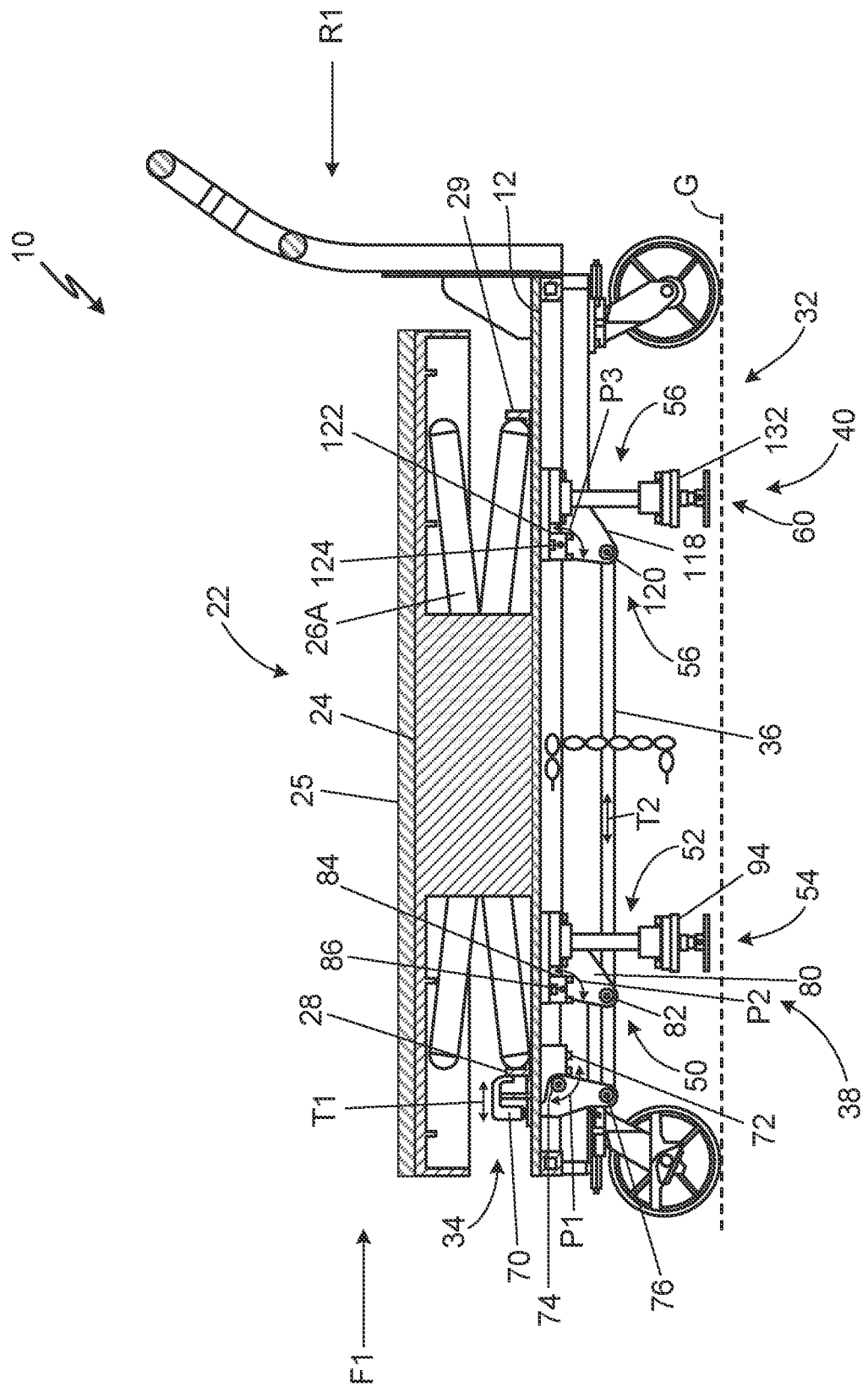
FIG. 5B is a cross sectional view of the lift cart.

FIG. 4 is a side view of lift cart 10 with scissor lift table 22 in the raised position and braking device 32 in the deployed state. FIG. 5A is a side view of lift cart 10 with scissor lift table 22 in the lowest position and braking device 32 in the retracted state. FIG. 5B is a cross sectional view of lift cart 10 taken through cart platform 12 and scissor lift table 22 and adjacent to a side of braking device 32. FIG. 5B shows lift cart 10 with scissor lift table 22 in the lowest position and braking device 32 in the retracted state. Lift cart 10 includes cart platform 12, scissor lift table 22, and braking device 32. Scissor lift table 22 includes table platform 24, adapter plate 25, scissor legs 26A (shown in FIG.

5B), scissor legs 26B (shown in FIG. 4 and FIG. 5A), cross member 28 (shown in FIG. 5B) and guide frame 29. Braking device 32 includes actuator 34, linkage bar 36, first brake assembly 38, and second brake assembly 40. Actuator 34 includes actuator claw 70, actuator mounting block 72 (shown in FIG. 5B), pivot mount 74 (shown in FIG. 5B), and attachment point 76. First brake assembly 38 includes first linkage assembly 50, first brake extension assembly 52, and first brake post assembly 54. First linkage assembly 50 includes rocker arm 80 and attachment point 82. First brake extension assembly 52 includes rocker arm mounting block 84 (shown in FIG. 5B), pivot mount 86 (shown in FIG. 5B), drop linkage 90 (shown in FIG. 3A), and compression plate 94. Second brake assembly 40 includes second linkage assembly 56, second brake extension assembly 58, and second brake post assembly 60. Second linkage assembly 56 includes rocker arm 118 and attachment point 120. Second brake extension assembly 58 includes rocker arm mounting block 122 (shown in FIG. 5B), pivot mount 124 (shown in FIG. 5B), drop linkage 128 (shown in FIG. 3A), and compression plate 132. FIGS. 4-5B also include front F1, rear R1, and floor G. FIG. 5B also shows arrow T1, arrow T2, arrow P1, arrow P2, and arrow P3.

Lift cart 10 is positioned in FIGS. 4-5B so that front F1 of lift cart 10 is toward the left of the figures and rear R1 is toward the right of the figures. Lift cart 10 is sitting on floor G. Lift cart 10 has platform 12 that forms a base of lift cart 10. Scissor lift table 22 is connected to the top side of cart platform 12. Table platform 24 is a top of scissor lift table 22. Adapter plate 25 can optionally be bolted onto a top side of table platform 24. Scissor legs 26A and scissor legs 26B are connected to and extend between a bottom side of table platform 24 and the top side of cart platform 12. Cross member 28 connects scissor legs 26A and scissor legs 26B and is adjacent to the top side of cart platform 12. Scissor legs 26A and scissor legs 26B are positioned within guide frame 29. Guide frame 29 is connected to the top side of cart platform 12. Braking device 32 is connected to the bottom side of cart platform 12. Actuator 34 is toward a front of braking device 32 and front F1 of lift cart 10. Actuator 34 extends through cart platform 12 from the top side to the bottom side. A front of linkage bar 36 connects to actuator 34. Linkage bar 36 also connects to first brake assembly 38 and second brake assembly 40. Second brake assembly 40 connects to the rear of linkage bar 36. First brake assembly 38 connects to linkage bar 36 between actuator 34 and second brake assembly 40.

Actuator 34 includes actuator claw 70, actuator mounting block 72, pivot mount 74, and attachment point 76. Actuator claw 70 hooks around a front of guide frame 29 so that an upper portion of actuator claw 70 can contact and be activated by cross member 28. Actuator claw 70 extends through cart platform 12 from the top side to the bottom side. Actuator claw 70 pivotally mounts to the bottom side of cart platform 12 by actuator mounting block 72. Pivot mount 74 pivotally holds actuator claw 70 to actuator mounting block 72. Actuator 34 connects to the front of linkage bar 36 by attachment point 76 through a lower portion of actuator claw 70.

First brake assembly 38 connects to linkage bar 36 by first linkage assembly 50. First linkage assembly 50 includes rocker arm 80 and attachment point 82. Rocker arm 80 is a triangular linkage member. The first vertex of rocker arm 80 connects to linkage bar 36 by attachment point 82. The second vertex and the third vertex of rocker arm 80 connect to first brake extension assembly 52. First linkage assembly 50 links first brake extension assembly 52 to linkage bar 36.

First brake extension assembly 52 connects first linkage assembly 50 to first brake post assembly 54. First brake extension assembly 52 includes rocker arm mounting block 84, pivot mount 86, drop linkage 90 (shown in FIG. 3A) and compression plate 94. Rocker arm mounting block 84 connects to the second vertex of rocker arm 80 with pivot mount 86. Rocker arm mounting block 84 is fixed to the bottom side of cart platform 12. The third vertex of rocker arm 80 connects to drop linkage 90. Drop linkage 90 is located within first brake extension assembly 52 between the bottom side of cart platform 12 and compression plate 94. First brake extension assembly 52 is spring-loaded. Drop linkage 90 connects to first brake post assembly 54. First brake post assembly 54 extends through and is fixed to compression plate 94.

Second brake assembly 40 has a similar configuration to first brake assembly 38. Second brake assembly 40 connects to linkage bar 36 by second linkage assembly 56. Second linkage assembly 56 includes rocker arm 118 and attachment point 120. Rocker arm 118 is a triangular linkage member. The first vertex of rocker arm 118 connects to linkage bar 36 by attachment point 120. The second vertex and the third vertex of rocker arm 118 connect to second brake extension assembly 58. Second linkage assembly 56 links second brake extension assembly 58 to linkage bar 36.

Second brake extension assembly 58 connects second linkage assembly 56 to second brake post assembly 60. Second brake extension 58 assembly includes rocker arm mounting block 122, pivot mount 124, drop linkage 128 (shown in FIG. 3A), and compression plate 132. Rocker arm mounting block 122 connects to the second vertex of rocker arm 118 with pivot mount 124. Rocker arm mounting block 122 is fixed to the bottom side of cart platform 12. The third vertex of rocker arm 118 connects to drop linkage 128. Drop linkage 128 is located within second brake extension assembly 58 between the bottom side of cart platform 12 and compression plate 132. Second brake extension assembly 58 is spring-loaded. Drop linkage 128 connects to second brake post assembly 60. Second brake post assembly 60 extends through and is fixed to compression plate 132.

Lift cart 10 is designed so that braking device 32 is in the deployed state when scissor lift table 22 is in the raised position and actuator 34 is released, as shown in FIG. 4. Lift cart 10 is also designed so that braking device 32 is in the retracted state only when scissor lift table 22 is in the lowest position. Scissor lift table 22 is in the lowest position when table platform 24 is as close to the upper surface of cart platform 12 as scissor legs 26A and scissor legs 26B allow. Scissor lift table 22 is in the raised position when table platform 24 is at any position higher than the lowest position. When braking device 32 is in the deployed state, first brake assembly 38 and second brake assembly 40 are in the deployed state. First brake post assembly 54 is in the deployed state and resting on floor G when first brake assembly 38 is in the deployed state. Second brake post assembly 60 is in the deployed state and resting on floor G when second brake assembly 40 is in the deployed state. Braking device 32 moves from the deployed state to the retracted state when scissor lift table 22 moves from the raised position to the lowest position. Scissor legs 26A and scissor legs 26B support and move table platform 24 vertically from the raised position to the lowest position. Guide frame 29 bounds the movement of scissor legs 26A and scissor legs 26B to moving forward and backward within guide frame 29. When scissor lift table 22 is in the raised position, cross member 28 is not in contact with actuator 34 (shown in FIG. 1A). As scissor lift table 22 moves to the lowest position, cross member 28 moves towards front F1 of lift cart 10 and contacts actuator 34.

Lift cart 10 is designed so that braking device 32 is in the retracted state only when scissor lift table 22 is in the lowest position, as shown in FIGS. 5A-5B. Braking device 32 moves from the retracted state to the deployed state when scissor lift table 22 is moved to the lowest position. Moving scissor lift table 22 to the lowest position activates actuator 34 and provides the force necessary to move braking device 32 to the retracted state. As scissor lift table 22 is moved into the lowest position, cross member 28 pushes against and activates actuator 34 at the upper portion of actuator claw 70 that is hooked around guide frame 29. Cross member 28 translates the upper portion of actuator claw 70 forward, as shown by arrow T1 (shown in FIG. 5B). The front side of guide frame 29 acts as a stop for scissor lift table 22 and actuator claw 70. Actuator claw 70 pivots counterclockwise around pivot mount 74, as shown by arrow P1 (shown in FIG. 5B), when cross member 28 translates the upper portion of actuator claw 70 forward. Counterclockwise pivoting of actuator claw 70 translates linkage bar 36 toward the rear of braking device 32 and the rear of lift cart 10, as shown by arrow T2 (shown in FIG. 5B).

First brake assembly 38 moves from the deployed state to the retracted state as linkage bar 36 translates rearward. Rearward translation of linkage bar 36 causes the first vertex of rocker arm 80 to translate rearward. The translation of the first vertex of rocker arm 80 causes the second vertex of rocker arm 80 to pivot counterclockwise around pivot point 86, as shown by arrow P2 (shown in FIG. 5B). The movements of the first vertex and the second vertex cause the third vertex of rocker arm 80 to translate vertically upwards. Counterclockwise pivoting in rocker arm 80 pulls drop linkage 90 upwards with the third vertex of rocker arm 80. Drop linkage 90 in turn raises first brake post assembly 54 from the deployed state to the retracted state. Raising first brake post assembly 54 raises compression plate 94 and compresses the gas springs in spring-loaded first brake extension assembly 52. Continued pressure from cross member 28 on actuator claw 70 keeps the gas springs in first brake extension assembly 52 compressed.

Second brake assembly 40 moves from the deployed state to the retracted state as linkage bar 36 translates rearward. Rearward translation of linkage bar 36 causes the first vertex of rocker arm 118 to translate rearward. The translation of the first vertex of rocker arm 118 causes the second vertex of rocker arm 118 to pivot counterclockwise around pivot point 124, as shown by arrow P3 (shown in FIG. 5B). The movements of the first vertex and the second vertex cause the third vertex of rocker arm 118 to translate vertically upwards. Counterclockwise pivoting in rocker arm 118 pulls drop linkage 128 upwards with the third vertex of rocker arm 118. Drop linkage 128 in turn raises second brake post assembly 60 from the deployed state to the retracted state. Raising second brake post assembly 60 raises compression plate 132 and compresses the gas springs in spring-loaded second brake extension assembly 58. Continued pressure from cross member 28 on actuator claw 70 keeps the gas springs in second brake extension assembly 58 compressed. When first brake post assembly 54 and second brake post assembly 60 are in the retracted state, braking device 32 is in the retracted state and lift cart 10 is movable. Braking device 32 is only in the retracted state when scissor lift table 22 is in the lowest position.

Lift cart 10 is designed so that braking device 32 is in the deployed state when scissor lift table 22 is in the raised position, as shown in FIG. 4. Braking device 32 moves from the retracted state to the deployed state when scissor lift table 22 moves from the lowest position to the raised position. As scissor lift table 22 moves to the raised position, cross member 28 moves away from actuator 34. Cross member 28 no longer provides force against actuator 34 when scissor lift table 22 is in the raised position. When actuator 34 is released, the gas springs within spring-loaded first brake extension assembly 52 and spring-loaded second brake extension assembly 58 are released. When spring-loaded first brake extension assembly 52 is released, stored compressive force pushes compression plate 94 down. Compression plate 94 moves first brake post assembly 54 into the deployed state. First brake post assembly 54 rests on floor G when in the deployed state. Drop linkage 90 (shown in FIG. 3A) is pulled down by first brake post assembly 54. Drop linkage 90 pulls the third vertex of rocker arm 80 down and pivots rocker arm 80 clockwise around pivot point 86, as shown by arrow P2 (shown in FIG. 5B). When spring-loaded second brake extension assembly 58 is released, stored compressive force pushes compression plate 132 down. Compression plate 132 moves second brake post assembly 60 into the deployed state. Second brake post assembly 60 rests on floor G when in the deployed state. Drop linkage 128 (shown in FIG. 3A) is pulled down by second brake post assembly 60. Drop linkage 128 pulls the third vertex of rocker arm 118 down and pivots rocker arm 118 clockwise around pivot point 124 (shown by arrow P3 in FIG. 5B). Clockwise pivoting of rocker arm 80 and rocker arm 118 translates linkage bar 36 towards the front of braking device 32 and lift cart 10 (shown by arrow T2 in FIG. 5B). Forward translation of linkage bar 36 pivots actuator claw 70 clockwise around pivot point 74 (shown by arrow P1 in FIG. 5B). Braking device 32 is in the deployed state when scissor lift table 22 is in the raised position and lift cart 10 cannot move.

Lift cart 10 is designed so that brake device 32 is automatically set when scissor lift table 22 is in a raised position. To move braking device 32 from the deployed state into the retracted state, scissor lift table 22 must be in the lowest position. Forward cross member 28 must be in contact with actuator claw 70 to activate actuator 34. Actuator 34 must be activated to retract braking device 32. Lift cart 10 sets braking device 32 without other human intervention when scissor lift table 22 is raised. Requiring scissor lift table 22 to be in the lowest position before braking device 32 is put in the retracted state means that lift cart 10 has the lowest center of gravity possible when it can move. Decreasing the center of gravity of lift cart 10 decreases the likelihood of tip-over incidents when lift cart 10 is being moved. Braking device 32 is completely mechanical and interacts with scissor lift table 22 mechanically. This reduces the need for batteries or electronics and in turn reduces the cost of manufacturing and operating lift cart 10.

Discussion of Possible Embodiments

The following are non-exclusive descriptions of possible embodiments of the present invention.

A lift cart includes a lift table that moves between a raised position and a lowest position and a braking device attached to the lift cart. The braking device includes an actuator, a linkage bar and a first brake assembly. The actuator is activated when the lift table is in the lowest position. The linkage bar is connected to the actuator. The linkage bar translates in a first direction when the actuator is activated. The first brake assembly is connected to the linkage bar. The first brake assembly moves from a deployed state to a retracted state as the linkage bar translates in the first direction.

The lift cart of the preceding paragraph can optionally include, additionally and/or alternatively, any one or more of the following features, configurations and/or additional components:

A further embodiment of the foregoing lift cart, wherein when the first brake assembly is in the deployed state, the first brake assembly rests on a floor, and wherein when the first brake assembly is in the retracted state, the first brake assembly is raised off a floor.

A further embodiment of any of the foregoing lift carts, wherein the first brake assembly further includes a first brake post assembly that retracts from a floor as the gas spring is compressed.

A further embodiment of any of the foregoing lift carts, wherein the first brake assembly further includes a first linkage assembly linking the first brake assembly to the linkage bar. The first linkage assembly includes a first rocker arm connected to the linkage bar. The first rocker arm pivots as the linkage bar translates in the first direction.

A further embodiment of any of the foregoing lift carts, wherein the first brake assembly further includes a first brake post assembly and a first brake extension assembly. The first brake extension assembly connects to the first linkage assembly and to the first brake post assembly. The first brake extension assembly includes a first drop linkage. The first drop linkage is connected to the first linkage assembly and the first brake post assembly. The first drop linkage is pulled upwards by the first linkage assembly to raise the first brake post assembly form the deployed state to the retracted state.

A further embodiment of any of the foregoing lift carts, wherein the braking device further includes a second brake assembly connected to the linkage bar. The second brake assembly moves from a deployed state to a retracted state as the linkage bar translates in the first direction.

A lift cart includes a cart platform, a lift table connected to a top side of the cart platform, and a braking device connected to a bottom side of the cart platform. The lift table moves between a raised position and a lowest position. The lift table includes a table platform, legs connected to and extending between a bottom side of the table platform and the top side of the cart platform, and a cross member connect the legs and positioned adjacent to the top side of the cart platform. The braking device includes an actuator, a linkage bar connected to the actuator, and a first brake assembly connected to the linkage bar. The cross member of the lift table activates the actuator when the lift table is in the lowest position. The linkage bar translates in a first direction when the actuator is activated. The first brake assembly moves from a deployed state to a retracted state as the linkage bar translates in the first direction.

The lift cart of the preceding paragraph can optionally include, additionally and/or alternatively, any one or more of the following features, configurations and/or additional components:

A further embodiment of the foregoing lift cart, wherein in the lowest position, the table platform of the lift table is fully lowered, and wherein in the raised position, the table platform of the lift table is in any position other than the lowest position.

A further embodiment of the foregoing lift cart, wherein the actuator includes an actuator claw pivotally mounted to the cart platform. The cross member contacts an upper portion of the actuator claw when the lift table is in the lowest position to induce the actuator claw to pivot about a pivot point.

A further embodiment of any of the foregoing lift carts, wherein when the first brake assembly is in the deployed state, the first brake assembly rests on a floor and when the first brake assembly is in the retracted state, the first brake assembly is raised from the floor.

A further embodiment of any of the foregoing lift carts, wherein the first brake assembly further comprises a gas spring the compresses as the first brake assembly moves to the retracted state.

A further embodiment of any of the foregoing lift carts, wherein the first brake assembly further comprises a first brake post assembly that retracts from a floor as the gas spring is compressed.

A further embodiment of any of the foregoing lift carts, wherein the first brake assembly also includes a first linkage assembly linking the first brake assembly to the linkage bar. The first linkage assembly includes a first rocker arm connected to the linkage bar. The first linkage bar is also pivotally mounted to the bottom side of the care platform. The first rocker arm pivots about a pivot point as the linkage bar translates in the first direction.

A further embodiment of any of the foregoing lift carts, wherein the first brake assembly also includes a first brake extension assembly and a first brake post assembly. The first brake extension assembly connects to the first linkage assembly. The first brake post assembly connects to the first brake extension assembly.

A further embodiment of any of the foregoing lift carts, wherein the first brake extension assembly includes a first drop linkage and a gas spring. The first drop linkage is connected to the first linkage assembly and the first brake post assembly. The first drop linkage is pulled upwards by the first linkage assembly to raise the first brake post assembly from the deployed state to the retracted state. The gas spring extends between a bottom side of the cart platform and the first brake post assembly. The first gas spring compresses as the first brake post assembly is raised from the deployed state to the retracted state.

A further embodiment of any of the foregoing lift carts, wherein the braking device includes a second brake assembly connected to the linkage bar. The second brake moves from a deployed state to a retracted state as the linkage bar translates in the first direction.

A lift cart includes a cart platform, a scissor lift table, and a braking device. The scissor lift table connects to a top side of the cart platform and moves between a raised position and a lowest position. The scissor lift table includes a table platform, scissor legs, and a cross member. The scissor legs connect to and extend between a bottom side of the table platform and a top side of the cart platform. The cross member connects the scissor legs and is positioned adjacent to the top side of the cart platform. The braking device is connected to a bottom side of the cart platform. The braking device includes an actuator, a linkage bar, and a first brake assembly. The actuator extends through the cart platform for the top side to the bottom side. The cross member of the scissor lift table activates the actuator when the scissor lift table is in the lowest position. The linkage bar connects to the actuator. The linkage bar translates in a first direction when the actuator is activated. The first brake assembly connects to the linkage bar. The first brake assembly moves from a deployed state to a retracted state as the linkage bar translates in the first direction.

The lift cart of the preceding paragraph can optionally include, additionally and/or alternatively, any one or more of the following features, configurations and/or additional components:

A further embodiment of the foregoing lift cart, wherein first brake assembly also includes a first linkage assembly linking the first brake assembly to the linkage bar. The first linkage assembly includes a first rocker arm. The first rocker arm is connected to the linkage bar and pivotally mounted to the bottom side of the cart platform. The first rocker arm pivots about a pivot point as the linkage bar translates in the first direction.

A further embodiment of any of the foregoing lift carts, wherein the first brake assembly also includes a first brake post assembly and a first brake extension assembly. The first brake extension assembly connects to the first linkage assembly and the first brake post assembly. The first brake extension assembly includes a first drop linkage and a first gas spring. The first drop linkage connects to the first linkage assembly and the first brake post assembly. The first drop linkage is pulled upwards by the first linkage assembly to raise the first brake post assembly from the deployed state to the retracted state. The first gas spring extends between a bottom side of the cart platform and the first brake post assembly. The first gas spring compresses as the first brake post assembly is raised from the deployed state to the retracted state.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A lift cart comprising:
   a lift table that moves between a raised position and a lowest position; and
   a braking device attached to the lift cart, wherein the braking device comprises:
      an actuator that is activated when the lift table is in the lowest position;
      a linkage bar, connected to the actuator, that translates in a first direction when the actuator is activated; and
      a first brake assembly, connected to the linkage bar, that moves from a deployed state to a retracted state as the linkage bar translates in the first direction, wherein the first brake assembly comprises:
         a first linkage assembly linking the first brake assembly to the linkage bar, wherein the first linkage assembly comprises:
            a first rocker arm connected to the linkage bar, wherein the first rocker arm is a triangular linkage member, and wherein the first rocker arm pivots as the linkage bar translates in the first direction.

2. The lift cart of claim 1, wherein when the first brake assembly is in the deployed state, the first brake assembly rests on a floor, and wherein when the first brake assembly is in the retracted state, the first brake assembly is raised off a floor.

3. The lift cart of claim 1, wherein the first brake assembly further comprises:
   a gas spring that compresses as the first brake assembly moves to the retracted state.

4. The lift cart of claim 3, wherein the first brake assembly further comprises:
   a first brake post assembly that retracts from a floor as the gas spring is compressed.

5. The lift cart of claim 1, wherein the first brake assembly further comprises:
   a first brake post assembly; and
   a first brake extension assembly connected to the first linkage assembly and to the first brake post assembly, wherein the first brake extension assembly comprises:
      a first drop linkage connected to the first linkage assembly and the first brake post assembly, wherein the first drop linkage is pulled upwards by the first linkage assembly to raise the first brake post assembly from the deployed state to the retracted state.

6. The lift cart of claim 1, wherein the braking device further comprises:
   a second brake assembly connected to the linkage bar, wherein the second brake assembly moves from a deployed state to a retracted state as the linkage bar translates in the first direction.

7. A lift cart comprising:
   a cart platform;
   a lift table connected to a top side of the cart platform that moves between a raised position and a lowest position, wherein the lift table comprises:
      a table platform;
      legs connected to and extending between a bottom side of the table platform and the top side of the cart platform; and
      a cross member connecting the legs and positioned adjacent to the top side of the cart platform; and
   a braking device connected to a bottom side of the cart platform, wherein the braking device is positioned longitudinally along the bottom side of the cart platform, and wherein the braking device comprises:
      an actuator, wherein the cross member of the lift table activates the actuator when the lift table is in the lowest position;
      a linkage bar connected to the actuator and positioned longitudinally along the bottom of the cart platform, wherein the linkage bar translates in a first direction when the actuator is activated; and
      a first brake assembly connected to the linkage bar, wherein the first brake assembly moves from a deployed state to a retracted state as the linkage bar translates in the first direction.

8. The lift cart of claim 7, wherein in the lowest position, the table platform of the lift table is fully lowered, and wherein in the raised position, the table platform of the lift table is in any position other than the lowest position.

9. The lift cart of claim 7, wherein the actuator comprises:
   an actuator claw pivotally mounted to the cart platform;
   wherein the cross member contacts an upper portion of the actuator claw when the lift table is in the lowest position to induce the actuator claw to pivot about a pivot point.

10. The lift cart of claim 7, wherein when the first brake assembly is in the deployed state, the first brake assembly rests on a floor, and wherein when the first brake assembly is in the retracted state, the first brake assembly is raised from the floor.

11. The lift cart of claim 7, wherein the first brake assembly further comprises:
a gas spring that compresses as the first brake assembly moves to the retracted state.

12. The lift cart of claim 11, wherein the first brake assembly further comprises:
a first brake post assembly that retracts from a floor as the gas spring is compressed.

13. The lift cart of claim 7, wherein the first brake assembly further comprises:
a first linkage assembly linking the first brake assembly to the linkage bar, wherein the first linkage assembly comprises:
a first rocker arm connected to the linkage bar and pivotally mounted to the bottom side of the cart platform;
wherein the first rocker arm pivots about a pivot point as the linkage bar translates in the first direction.

14. The lift cart of claim 13, wherein the first brake assembly further comprises:
a first brake extension assembly connected to the first linkage assembly; and
a first brake post assembly connected to the first brake extension assembly.

15. The lift cart of claim 12, wherein the first brake extension assembly comprises:
a first drop linkage connected to the first linkage assembly and the first brake post assembly, wherein the first drop linkage is pulled upwards by the first linkage assembly to raise the first brake post assembly from the deployed state to the retracted state; and
a first gas spring extending between a bottom side of the cart platform and the first brake post assembly, wherein the first gas spring compresses as the first brake post assembly is raised from the deployed state to the retracted state.

16. The lift cart of claim 7, wherein the braking device further comprises:
a second brake assembly connected to the linkage bar, wherein the second brake assembly moves from a deployed state to a retracted state as the linkage bar translates in the first direction.

17. A lift cart comprising:
a cart platform;
a scissor lift table connected to a top side of the cart platform that moves between a raised position and a lowest position, wherein the scissor lift table comprises:
a table platform;
scissor legs connected to and extending between a bottom side of the table platform and the top side of the cart platform; and
a cross member connecting the scissor legs and positioned adjacent to the top side of the cart platform; and
a braking device connected to a bottom side of the cart platform, wherein the braking device comprises:
an actuator extending through the cart platform from the top side to the bottom side, wherein the cross member of the scissor lift table activates the actuator when the scissor lift table is in the lowest position;
a linkage bar connected to the actuator and positioned longitudinally along the bottom of the cart platform, wherein the linkage bar translates in a first direction when the actuator is activated; and
a first brake assembly connected to the linkage bar, wherein the first brake assembly moves from a deployed state to a retracted state as the linkage bar translates in the first direction.

18. The lift cart of claim 17, wherein the first brake assembly further comprises:
a first linkage assembly linking the first brake assembly to the linkage bar, wherein the first linkage assembly comprises:
a first rocker arm connected to the linkage bar and pivotally mounted to the bottom side of the cart platform;
wherein the first rocker arm pivots about a pivot point as the linkage bar translates in the first direction.

19. The lift cart of claim 18, wherein the first brake assembly further comprises:
a first brake post assembly; and
a first brake extension assembly connected to the first linkage assembly and the first brake post assembly, wherein the first brake extension assembly comprises:
a first drop linkage connected to the first linkage assembly and the first brake post assembly, wherein the first drop linkage is pulled upwards by the first linkage assembly to raise the first brake post assembly from the deployed state to the retracted state; and
a first gas spring extending between a bottom side of the cart platform and the first brake post assembly, wherein the first gas spring compresses as the first brake post assembly is raised from the deployed state to the retracted state.

* * * * *